United States Patent [19]

Futatsugi et al.

[11] Patent Number: 5,261,112
[45] Date of Patent: Nov. 9, 1993

[54] SPELLING CHECK APPARATUS INCLUDING SIMPLE AND QUICK SIMILAR WORD RETRIEVAL OPERATION

[75] Inventors: Nobuyoshi Futatsugi, Utsunomiya; Toshinori Sawada, Tokyo, both of Japan

[73] Assignee: Casio Computer Co., Ltd., Tokyo, Japan

[21] Appl. No.: 574,692

[22] Filed: Aug. 28, 1990

[30] Foreign Application Priority Data

Sep. 8, 1989 [JP] Japan ............... 1-105798[U]
Feb. 21, 1990 [JP] Japan ............... 2-40671

[51] Int. Cl.⁵ .................. G06F 7/04; G06F 5/21
[52] U.S. Cl. ............... 395/800; 364/225.3; 364/225.4; 364/225.6; 364/943.43
[58] Field of Search ............ 364/DIG. 7, DIG. 4; 395/800

[56] References Cited

U.S. PATENT DOCUMENTS

| | | | |
|---|---|---|---|
| 4,381,551 | 4/1983 | Kanou et al. | 364/900 |
| 4,775,251 | 10/1988 | Suzuki | 364/900 |
| 4,830,618 | 5/1989 | David | 434/169 |
| 4,903,206 | 2/1990 | Itoh | 364/419 |

*Primary Examiner*—David Y. Eng
*Attorney, Agent, or Firm*—Frishauf, Holtz, Goodman & Woodward

[57] ABSTRACT

A spelling check apparatus checks a spelling of a word entered from a keyboard, and also displays a word having a spelling similar to the spelling of the input word. The input word is modified by way of plural preselected methods, and when this modified word coincides with a word which has been stored in a word dictionary memory employed in this spelling check apparatus, this modified word is regarded as the similar word. The similar word is displayed every time the modification process for the input word by one preselected method has been accomplished.

15 Claims, 4 Drawing Sheets

SPELLING CHECK APPARATUS INCLUDING SIMPLE AND QUICK SIMILAR WORD RETRIEVAL OPERATION

BACKGROUND OF THE INVENTION

1. Field of the Invention

The present invention generally relates to a spelling check apparatus for judging whether or not a spelling of a word inputted therein is correct. More specifically, the present invention is directed to a spelling check apparatus for selecting another word similar to the entered word and for outputting the selected word.

2. Related Art of the Invention

Very recently, electronic appliances, so-called "spelling checkers" are commercially available in which the word data are previously stored into the memory built in the electronic appliance, and the spelling of the key-inputted word is compared with the above-described word data so as to check whether or not the key-inputted word is spelled correctly.

In general, a "Spell" key and a "Similar" key are provided on the keyboard of such spelling check apparatuses. When a spelling of one word is entered and the "Spell" key is manipulated on the keyboard, if there is an erroneous spelling in the entered word, an indication "misspelling" is made and also another word having a spelling similar to that of the input word is displayed. On the other hand, when the spelling of the inputted word is correct, an indication "correct spelling" is made. Under this condition, when the "Similar" key is operated, words similar to the entered word are retrieved and displayed.

However, in such conventional spelling check apparatuses, even when, for instance, although the entered word's spelling is not correct, this misspelled word is accidentally coincident with another word having a different meaning therefrom, the indication "correct spelling" is made when the "Spell" key is operated and the spelling check operation is accomplished. Then, in case that the inputted word is confirmed, the "Similar" key is further operated to represent the words similar to this inputted word. Among these words having the similar spellings, the word having the correct spelling must be found out for performing the spelling confirmation. Accordingly, there is a drawback that since the two different key operations are required so as to confirm the spelling of the inputted word, such a cumbersome key operation must be carried out.

Also, with respect to the retrieval operation of the similar word, another process, i.e., modification of the inputted word is necessarily required. In general, there are several word modification methods. That is, there exist for example, a method for substituting two adjoining characters with each other within a spelling; a method for deleting one character from an entire spelling; and a method for inserting a single character into an overall spelling. Generally speaking, in one of these modification methods, there are provided plural sorts of the modified words, and each of these modified words is successively compared with the word of the dictionary with respect to their spellings. If the spelling of the modified word is coincident with that of the word stored in the dictionary, this modified word is outputted as the word similar to the entered word.

In the above-described conventional spelling check apparatus, because such a coincidence checking method must be carried out for all modified words in accordance with the above-described plural checking methods, a lengthly process time is required so as to pick up the similar words. This implies that when a misspelled word is accidentally entered by an operator, a very long process time is required to finally know the correct word. This is another drawback in such an inconvenient spelling check method.

SUMMARY OF THE INVENTION

Therefore, an object of the present invention is to provide a spelling check apparatus with a simple operation for retrieving words each having a spelling similar to that of an inputted word thereby to be displayed within a short retrieval time.

To achieve the above-described object, a spelling check apparatus, in accordance with the present invention, includes input means for inputting a word the spelling of which is to be checked. An input word storage means stores word data which have been inputted to it from the input means. A plurality of words are pre-stored in a storage means. A spelling judgement means judges whether or not the word inputted into the input word storage means is coincident with a word stored in the storage means, and it recognizes that the inputted word has a correct spelling when there exists a coincidence between it and a pre-stored word. An indicating means indicates the judgement result reached by the judgement means that the spelling of the inputted word is correct. A similar word search means identifies a word having a spelling similar to the spelling of the word inputted by the input means from among the words stored in the storage means. A control means causes the similar word search means to start identifying the similar word when the judgement means has completed its operation.

A display means displays the similar word found by the similar word search means when the announcement means announces the judgement result.

Furthermore, a word retrieval apparatus, in accordance with the present invention, includes word storage means for pre-storing word data therein. An input means inputs character series data. An input data storage means stores the character series data inputted from the input means. A modification means modifies the character series data stored into the input data storage means based upon a plurality of predetermined methods so as to form a new character series. A search means searches from the storage means, word data coincident with the character series formed by the modification means. A control means outputs a search result made by the search means with respect to each of the modified character series every time the modification for the character series has been completed based upon one method of the modification means. dr

DETAILED DESCRIPTION OF THE PREFERRED EMBODIMENTS

Construction of Spelling Check Apparatus

Figure 1:
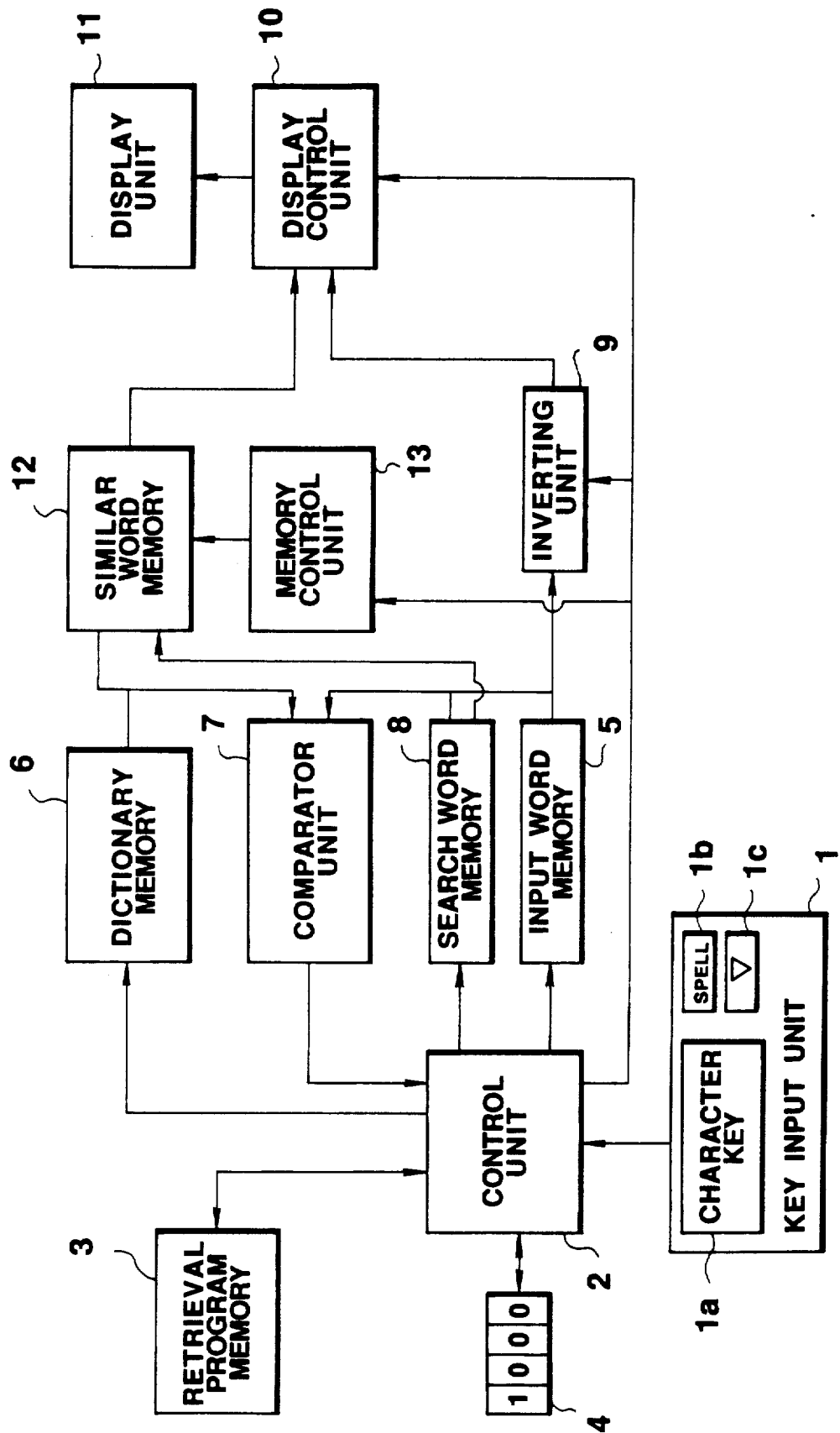
FIG. 1 is a schematic block diagram of a spelling check apparatus according to the present invention.

In FIG. 1, there is shown a circuit arrangement of a spelling check apparatus into which the present invention has been applied.

The spelling check apparatus includes a key input unit 1. The key input unit 1 is constructed of a character key 1a for inputting a word to be spelling-checked, a "Spell" key 1b used for instructing a commencement of a spelling check operation, and a "∇" key 1c employed to instruct a scroll operation of a display. The data inputted by the key operation is entered into a control unit 2.

The control unit 2 includes a ROM (read-only memory) for previously storing therein a program to control the overall spelling check apparatus, and controls various operations of the circuits. A retrieval program memory 3 stores therein another program related to a word modification process and used in a similar word retrieval operation. In this preferred embodiment, three different sorts of modification programs have been stored in this retrieval program memory 3, namely a modification achieved by character substitution, another modification effected by character deletion, and a further modification performed by character substitution and insertion. The control unit 2 modifies the input characters with employment of the program stored in this retrieval program memory 3, in order to retrieve similar words, namely words having spellings similar to the spelling of the input word. In this case, the sort of the actually used modification program is managed by a flag of a flag memory 4.

A first flag through a third flag of this flag memory 4 correspond to the modification program, whereas a fourth flag thereof corresponds to a flag indicative of an end of a retrieval operation.

Character data which has been entered into the spelling check apparatus from the key input unit 1 for the spelling check purpose, is inputted via the control unit 2 into an input word memory 5. Then, in response to the key operation of the "Spell" key 1b, the character data stored in the input word memory 5 is compared with words which have been stored in a dictionary memory 6 in a comparator unit 7. A comparison result made by the comparator unit 7 is supplied to the control unit 2. When no coincidence is made in the comparison, the stored data is again compared with a next word stored in the dictionary memory 6.

When the comparisons with respect to the memory contents of the input word memory 5 have been completed, the input word is modified in accordance with the modification program, and then inputted as a search word into a search word memory 8.

When a coincidence is established in the comparison operation between the input word and the word stored in the dictionary memory 6, the spelling of this input word is correct. Thus, this input word data is processed in an inverting unit 9 and then supplied to a display control unit 10, so that this input word is displayed with an inverted mode on a display unit 11. The reason why the inverted character is displayed is to clearly represent to an operator that the spelling of this input word is correct.

On the other hand, when a coincidence is made by comparing the search word, namely the modified input word with the word selected from the dictionary, each of the search words is sequentially written into a similar word memory 12. Also, another comparison is made between the data stored in the search word memory 8 and the data stored in the similar word memory 12 in order not to enter the search word which is completely identical to one previously written into the similar word memory 12. If there is no coincidence in this comparison, then this search word will be written into the similar word memory 12 as a new similar word.

Then, the data which have been stored into the similar word memory 12 are transferred via the display control unit 10 to the display unit 11. The data write/read operation of the similar word memory 12 is under control of the memory control unit 13.

SPELLING CHECK OPERATION

The spelling check operation by the spelling check apparatus with the above-described arrangement will now be described with reference to flowcharts shown in FIGS. 2 and 3, and also display states shown in FIG. 4.

Figure 2:
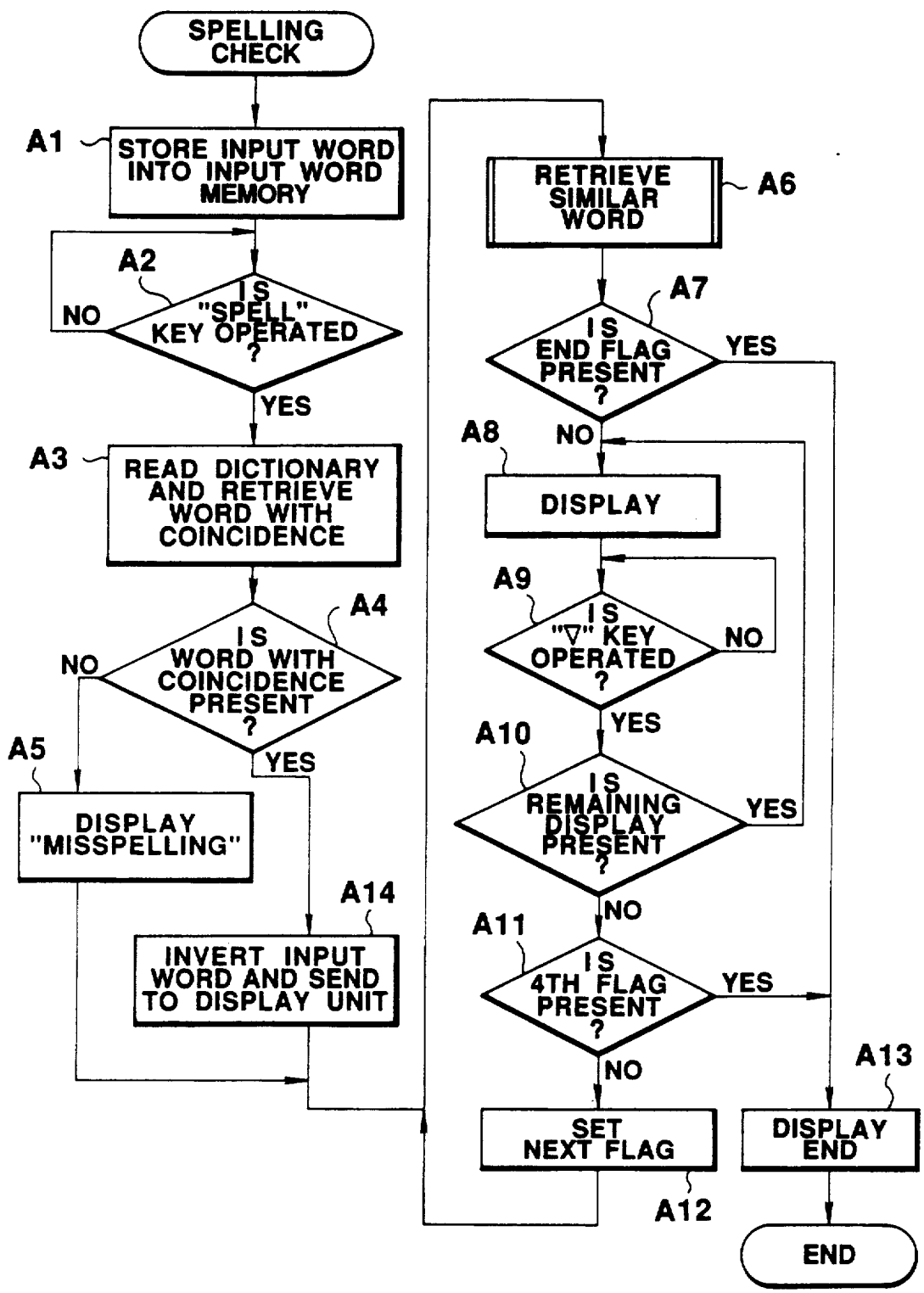
FIG. 2 is a flowchart for representing a spelling check operation effected by the spelling check apparatus shown in FIG. 1.
Figure 4A:
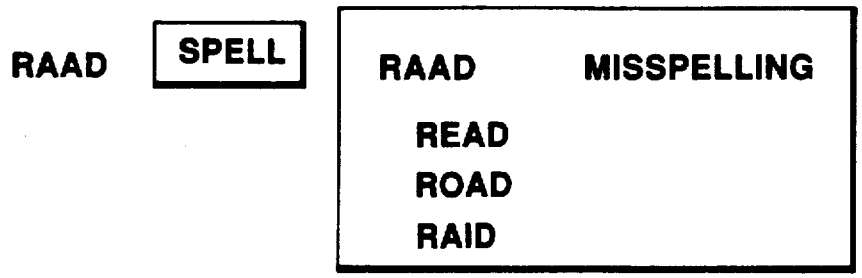
FIGS. 4A to 4C pictorially illustrate key operations and display conditions of the display unit.

As illustrated in FIG. 4A, when a character of "RAAD " is inputted and the "Spell" key 1b of the key input unit 1 is manipulated, the spelling check operation as defined in the flowchart represented in FIG. 2 is executed.

At a first step A1, the character input data (input word) is sent via the control unit 2 to the input word memory 5 and stored therein. Thereafter, when a judgement result is made that the "Spell" key is operated at a step A2, the process is advanced to a next step A3 in which the dictionary retrieval operation is carried out.

During the dictionary retrieval operation, the words which have been previously stored in the dictionary memory 6 are sequentially read out therefrom and furnished to the comparator unit 7, and thus compared with the input word, namely "RAAD". In case that the dictionary memory 6 has no word "RAAD", even when all of the words previously stored in the dictionary memory 6 are successively read out so as to be compared with the input word, no coincidence output is supplied from the comparator unit 7 to the control unit 2. As a result, a judgement result becomes "NO" at a step A4, and subsequently the process is advanced to a step A5 where the input character "RAAD" is transferred via the inverting unit 9 to the display control unit 10. In this case, since an inverting instruction is not outputted from the control unit 2 to the inverting unit 9, this input character is not processed in the inverting unit 9. At the same time, the control unit 2 sends such a display code "misspelling" to the display control unit 10. Thereafter, the process is advanced to a next step A6.

Figure 3:
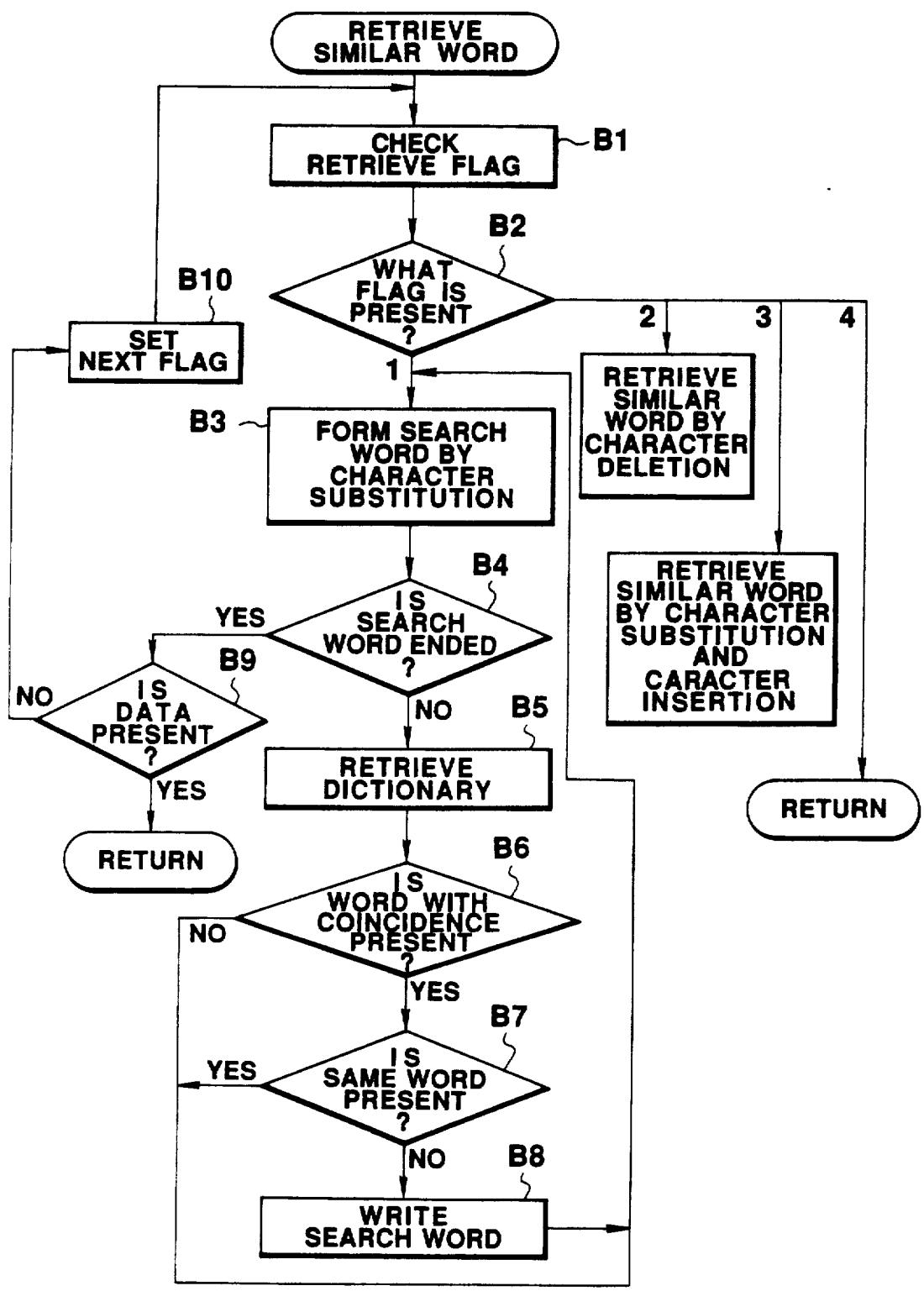
FIG. 3 is a flowchart for illustrating a similar word retrieval operation.

At this step A6, a similar word retrieval operation is executed based upon the input word, a detail of which is shown in another flowchart of FIG. 3.

In the similar word retrieval operation, a check is made to the content of the flag memory 4 at a first step B1. Since the first flag has been set under the initial condition, the process is advanced via a step B2 and branched at a next step B3 in which the character substitution modification method of the retrieval program memory 3 is executed under the control of the control unit 2.

At the first character substitution, when the input character "RAAD" is substituted by "READ", this "READ" is set as the search word into the search word memory 8. At a step B4, a check is made whether or not the possible character combinations according to the first modification program have been completed. In this case, the judgement result becomes "NO", then the process is advanced to a step B5, in which such a retrieval operation is performed by employing the comparator unit 7 whether or not the search word "READ" is contained in the dictionary memory 6.

As a result, if there exists the word having the same spelling in the dictionary 6, a judgement is made "YES" at a next step B6. Thereafter, the process is advanced to a step B7. At this step B7, the memory content of the similar word memory 12 is read out into the comparator unit 7, and thus is compared with the search word "READ" and furthermore, a judgement is made whether or not there is the same data. In other words, a check for preventing the same words to be doubly written into the similar word memory 12 is executed. To the contrary, if there is no same data, the spelling check process is advanced to a step B8, in which the word "READ" is written into the similar word memory 12. Then, this process is again returned to the previous step B3. In this step B3, the character substitution is carried out with respect to the next character, whereby a second modified word is formed, which will be then retrieved in a manner similar to the above-described retrieval process.

Assuming now that this second modified word corresponds to "RIAD", when the data constructed of this character series is not included in the dictionary memory 6, a judgement result is made "no coincidence" at the step B6, namely "NO". Thus, the process is returned to the previous step B3, so that a further modified word will now be formed.

As previously stated, various modified words are formed by way of one of the modification methods at the step B3. When the substitution process has been accomplished for all of the characters, a judgement is made at a step B4 that the substitution process has been completed, whereby no other search word is formed. Then, the process is advanced to a step B9. At this step B9, another judgement is made whether or not data has been written into the similar word memory 12. If YES, then the process is returned to the flow as shown in FIG. 2 and advanced to a step A7.

At the step A7, a check is made whether or not a fourth flag of the flag memory 4 has been set. In this case, since the first flag has been set, the check result becomes "NO" and thus the process is advanced to a step A8, in which the display process of the similar word is performed.

In accordance with this display process, the similar words stored in the similar word memory 12 is transferred to the display control unit 10 shown in FIG. 1. However, at this step, since the information on the misspelling is present at a first line of this display, three similar words stored in the similar word memory 12 are transferred therefrom to the display control unit 10 so as to be displayed on the display unit 11 as represented in FIG. 4A.

Under this condition, when the "∇" key 1b is operated, the control unit 2 receives this key signal and the process is advanced to a subsequent step. That is, the process proceeds from the step A9 to the step A10, at which a judgement is made whether or not the data which have not been displayed are left in the similar word memory 12.

Assuming now that more than 3 similar words have been acquired by way of the substitution method, a judgement result becomes "YES" at the step A10, and the process is returned to the previous step A8 in which the remaining similar word is displayed.

To the contrary, if a judgement result becomes "NO" at the step A10, the process is advanced to a step A11. Another judgement is made whether or not the fourth flag has been set at the step A11. In other words, if the fourth flag has not yet been set, a next flag is set at a step A12. When the first flag has been set, the second flag is set and then the process is advanced to a step A6, at which the retrieval flow of the similar word is commenced.

When the second flag is checked at the step B1 of the similar word retrieval flow, the process is advanced at the branch of the step B2 into the retrieval flow of the similar word.

Figure 4B:
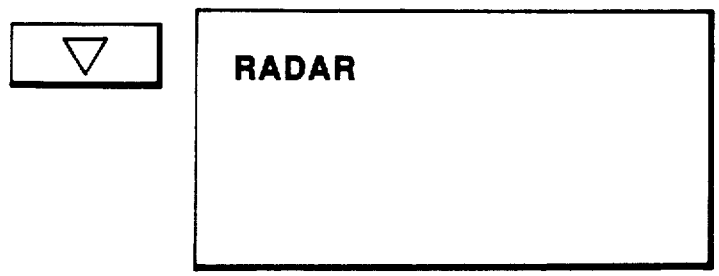

This retrieval flow is substantially same as the process defined at the above-described steps B3 to B9. However, there is merely such a different point that the formation of the search word as defined at the step B3 is performed by not substituting the characters, but deleting the characters. As a consequence, with respect to the input word "RAAD", a modified word "RAD" is formed and is to be retrieved in the dictionary, as described above. Thus, in case that even one similar word is obtained, after the search operation has been completed, a judgement result at the step B9 becomes "NO". Then, a next flag, i.e., third flag is set and the search operation is carried out with respect to the similar words modified by way of the character substitution and insertion. As a result, when a word "RADAR" is obtained as the similar word, a representation as shown in FIG. 4B is made.

When the "∇" key 1c is furthermore operated under this state, the further flag is set at a step A12, and the process is advanced via the steps A6 and A7 to a step A13 at which such a representation that no more similar word can be searched is made on the display unit 11, and thereafter the process is ended.

Figure 4C:
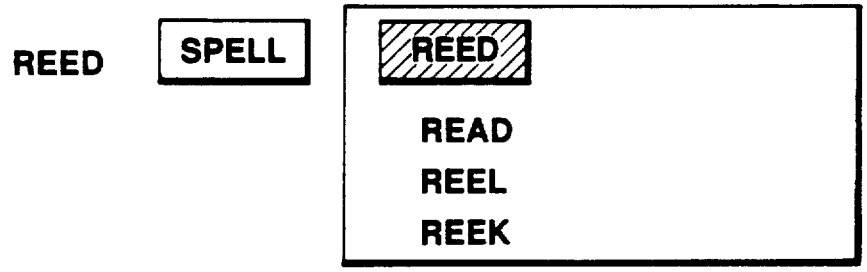

Subsequently, as indicated in FIG. 4C, if an operator mistakenly inputs "REED", instead of "READ" which is originally spelling-checked, the following operation is executed. Since the word "REED" has been stored in the dictionary memory 6, a judgement result becomes "YES" at the step A4 as defined in the flowchart shown in FIG. 2, and then the process is advanced to a step A14. Then, the input word "REED" stored in the input word memory 5 is first supplied to the inverting unit 9 in which the inverting code is attached to this input word, and thereafter supplied to the display control unit 10 under the condition that the control unit 2 furnishes the inverting instruction. Then, the process is advanced to a step A6 in which the similar word retrieval process is carried out. Since this retrieval process is the same as the above-described retrieval process, no further explanation thereof is made in the following description. Similar words formed based upon the input word "REED" are obtained and then stored into the similar word memory 12. As a result, the word "REED" is displayed in an inverting mode as represented in FIG. 4C, whereby a display such that this spelling "REED" is correct is made and also the similar words are displayed on the display unit 11. As a result, the operator can discover the originally desired spelling "READ" from this similar word representation.

As previously described, in case that the character modification method for performing a plurality of similar word retrieval operations is employed in the program, every time the retrieval operation is completed by way of one modification method, the retrieved result is outputted. As a consequence, in accordance with the spelling check apparatus of the present invention, the waiting time for announcing the spelling check result can be shortened.

What is claimed is:

1. A spelling check apparatus comprising:
   input means for inputting a word, a spelling of which is to be checked;
   dictionary means for previously storing a plurality of correctly spelled words therein;
   spelling judgment means for comparing the spelling of the word inputted from said input means with a spelling of any one of the words stored in said dictionary means, and for determining that the inputted word has a correct spelling when the spelling of the inputted word coincides with a spelling of any one of the words stored in said dictionary means, and for determining that the inputted word has an incorrect spelling when the spelling of the inputted word does not coincide with a spelling of any of the words stored in said dictionary means;
   indicating means for indicating that the inputted word has a correct spelling when said spelling judgement means determines that the inputted word has a correct spelling;
   similar word search means for performing a modification operation of rearranging some letters included in the word inputted by said input means to form a candidate word having a similar letter order to the originally inputted word, and for performing a search operation of identifying a word which has the same spelling as the candidate word among the words stored in said dictionary means;
   control means for causing said similar word search means to start the modification operation and the search operation when said indicating means indicates that the inputted word has a correct spelling; and
   display means for displaying the input word together with the word, as a similar word, having the same spelling as the candidate word found by said similar word search means when said indicating means indicates that the inputted word has a correct spelling.

2. A spelling check apparatus according to claim 1, wherein said similar word search means includes:
   modification means for rearranging some letters included in the word inputted by said input means so as to form said candidate word having a similar letter order to said inputted word; and
   comparing means for performing a comparing operation of comparing the candidate word formed by said modification means with the words stored in said dictionary means to identify a word which has the same letter order as the candidate word among the words stored in said dictionary means.

3. A spelling check apparatus according to claim 2, wherein said modification means of said similar word search means changes a letter order of the word inputted by said input means by changing a letter order of at least two letters included in said inputted word to form a candidate word.

4. A spelling check apparatus according to claim 3, wherein said similar word search means includes means for displaying a word identified by said comparing means on said display means, such word having the same letter order as the candidate word, every time said comparing means has finished a comparing operation with respect to every candidate word formed by said modification means.

5. A spelling check apparatus according to claim 2, wherein said modification means of said similar word search means changes a letter order of the word inputted from said input means by inserting a letter into the letter series of said input word to form a candidate word.

6. A spelling check apparatus according to claim 5, wherein said similar word search means includes means for displaying on said display means a word identified by said comparing means, such word having the same letter order as the candidate word, every time said comparing means has finished the comparing operation with respect to every candidate word formed by said modification means.

7. A spelling check apparatus according to claim 2, wherein said modification means of said similar word search means changes a letter order of the word inputted form said input means by deleting a letter from the letter series of said input word to form a candidate word.

8. A spelling check apparatus according to claim 7, wherein said similar word search means includes means for displaying on said display means a word identified by said comparing means, such word having the same letter order as the candidate word, every time said comparing means has finished the comparing operation with respect to every candidate word formed by said modification means.

9. A spelling check apparatus according to claim 1, wherein said indicating means includes means for indicating that spelling of the inputted word is not correct when said spelling judgement means determines that the inputted word has an incorrect spelling.

10. A spelling check apparatus according to claim 9, wherein said display means includes means for displaying the word, as a similar word, identified by said similar word search means at the same time when said indicating means indicates that the spelling of the inputted word is incorrect.

11. A word retrieval apparatus comprising:
    word storage means for previously storing word data therein;
    input means for inputting character series data;
    input data storage means for storing the character data inputted from the input means;
    modification means for changing a character order of the character series data stored in said input data storage means based upon a plurality of predetermined modification methods of changing a character order of the character series data so as to form new character series data;
    search means for searching through said storage means, for word data coincident with the new character series data formed by said modification means based on one of the modification methods; and
    control means for outputting a search result of the searching operation performed by said search means with respect to each of the character series data formed by said modification means every time the character order of the character series data stored in said input data storage means has been changed based upon one method of said modification methods.

12. A word retrieval apparatus according to claim 11, wherein said control means includes instruction means for instructing the modification means to change a character order of the character series data stored in said input data storage means based upon another modification method.

13. A word retrieval apparatus according to claim 12, wherein said instruction means includes a specific single key.

14. A word retrieval apparatus according to claim 12, wherein said instruction means includes means for detecting that said search means has found no word data in said word storage means which is coincident with the new character series data formed by said modification means based on one of the modification methods.

15. A method for searching through a memory into which word data have been stored for word data similar in character order to an input character series, comprising the following steps performed in the listed order:
   (a) preparing a plurality of modification means for changing a character order of the input character series by respective predetermined methods of changing a character order of the input character series;
   (b) selecting one of the prepared modification means for changing a character order of the input character series;
   (c) comparing the changed character order of the input character series with the word data stored in the memory, and storing the word data which is coincident in character order with the input character series of the changed character order;
   (d) outputting the stored word data; and
   (e) selecting and making a subsequent modification means change the character order of the input character series for the comparing step (c) after the word data has been outputted.

* * * * *